United States Patent [19]

Yokote et al.

[11] Patent Number: 4,787,644
[45] Date of Patent: Nov. 29, 1988

[54] HEIGHT CONTROL SYSTEM FOR AUTOMOTIVE VEHICLE WITH VEHICULAR PROFILE REGULATING FEATURE

[75] Inventors: Masatsugu Yokote; Hideo Ito; Kenzi Kawagoe; Kazunobu Kawabata, all of Kanagawa, Japan

[73] Assignee: Nissan Motor Company, Limited, Kanagawa, Japan

[21] Appl. No.: 46,520

[22] Filed: May 6, 1987

[51] Int. Cl.⁴ .............................................. B60G 17/00
[52] U.S. Cl. .................................. 280/6 R; 280/707; 280/DIG. 1
[58] Field of Search .......... 280/707, 6 R, 6.1, DIG. 1

[56] References Cited

U.S. PATENT DOCUMENTS

| | | | |
|---|---|---|---|
| 3,827,538 | 8/1974 | Morgan | 188/319 |
| 3,873,123 | 3/1975 | Joneleit | 280/707 |
| 3,945,664 | 3/1976 | Hiruma | 280/707 |
| 3,992,039 | 11/1976 | Hiruma | 280/703 |
| 4,017,099 | 4/1977 | Hegel et al. | 280/707 |
| 4,054,295 | 10/1977 | Elliott | 280/6.1 |
| 4,084,667 | 4/1978 | Kurrat | 188/275 |
| 4,105,216 | 8/1978 | Graham et al. | 280/6 R |
| 4,145,073 | 3/1979 | McLuckie et al. | 280/702 |
| 4,162,083 | 7/1979 | Zabler et al. | 280/703 |
| 4,164,664 | 8/1979 | Kasiewicz | 307/118 |
| 4,185,845 | 1/1980 | Misch et al. | 280/6 H |
| 4,266,790 | 5/1981 | Uemura et al. | 280/6.1 |
| 4,310,172 | 1/1982 | Claude et al. | 280/703 |
| 4,313,529 | 2/1982 | Kato et al. | 188/299 |
| 4,323,266 | 4/1982 | Savage | 280/707 |
| 4,327,936 | 5/1982 | Sekiguchi | 280/711 |
| 4,377,293 | 3/1983 | Senoo | 280/6 R |
| 4,382,603 | 5/1983 | Senoo | 280/6 R |
| 4,390,187 | 6/1983 | Maeda | 280/6 R |
| 4,401,310 | 8/1983 | Ishikawa et al. | 280/6.1 |
| 4,436,318 | 3/1984 | Ichikawa et al. | 280/707 |
| 4,462,610 | 7/1984 | Saito et al. | 280/707 |
| 4,463,839 | 8/1984 | Ashiba | 188/299 |
| 4,466,625 | 8/1984 | Kondo et al. | 280/6 R |
| 4,468,739 | 8/1984 | Woods et al. | 364/424 |
| 4,483,546 | 11/1984 | Brearley | 280/6 R |
| 4,518,169 | 5/1985 | Kuroki et al. | 280/6 R |
| 4,519,169 | 5/1985 | Smith | 51/241 S |
| 4,537,411 | 8/1985 | Naramoto | 280/6 R |
| 4,540,188 | 9/1985 | Mezoche et al. | 280/6 R |
| 4,568,093 | 2/1986 | Shimizu et al. | 280/6 R |
| 4,568,096 | 2/1986 | Yew et al. | 280/6.1 |
| 4,579,366 | 4/1986 | Doi et al. | 280/707 |
| 4,586,728 | 5/1986 | Tokunaga et al. | 280/707 |
| 4,595,072 | 6/1986 | Barnea | 180/169 |
| 4,616,163 | 10/1986 | Kanai et al. | 318/611 |
| 4,616,848 | 10/1986 | Sugasawa et al. | 280/707 |
| 4,621,832 | 11/1986 | Nakashima et al. | 280/707 |
| 4,624,477 | 11/1986 | Kumagai et al. | 280/707 |
| 4,647,069 | 3/1987 | Iijima | 280/707 |
| 4,651,290 | 3/1987 | Masaki et al. | 364/550 |
| 4,657,280 | 4/1987 | Ohmori | 280/707 |
| 4,659,104 | 4/1987 | Tanaka et al. | 280/707 |
| 4,669,749 | 6/1987 | Tanaka et al. | 280/707 |
| 4,696,489 | 9/1987 | Fujishiro et al. | 280/707 |
| 4,718,695 | 1/1988 | Kawagoe | 280/707 |

FOREIGN PATENT DOCUMENTS 2084692 4/1982 United Kingdom .

Primary Examiner—Kenneth R. Rice
Attorney, Agent, or Firm—Foley & Lardner, Schwartz, Jeffery, Schwaab, Mack, Blumenthal & Evans

[57] ABSTRACT

A vehicle height control system controls suspension assemblies to adjust the vehicle height within a predetermined height range. The vehicle height control system is further active to reduce differences in height at respective positions of the vehicle body so as to be within a predetermined acceptable height difference range.

21 Claims, 5 Drawing Sheets

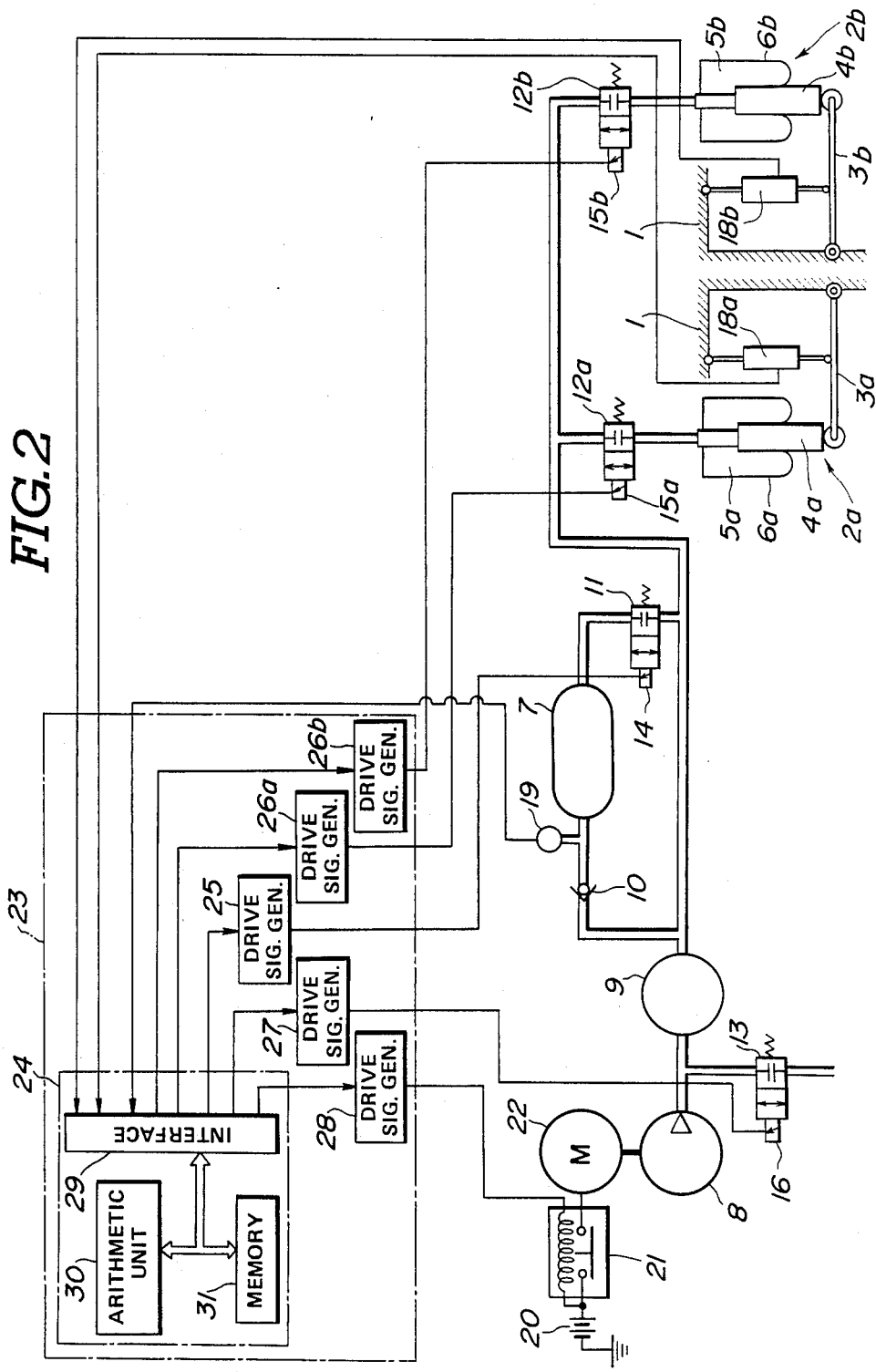

HEIGHT CONTROL SYSTEM FOR AUTOMOTIVE VEHICLE WITH VEHICULAR PROFILE REGULATING FEATURE

BACKGROUND OF THE INVENTION

1. Field of the Invention

The present invention relates generally to an automobile height control system which regulates the height position of a vehicle body relative to a road surface. More specifically, the invention relates to an automobile height control system which facilitates height adjustment at each of an automobiles suspension assemblys independently of the others. Further particularly, the invention relates to an automobile height control system which can regulate not only a vehicle's height but also a vehicle's attitude or inclination for improving driving stability, riding comfort and appearance.

2. Description of the Background Art

In recent years, there have been developed a plurality of automobile height control systems for facilitating better driving performance, riding comfort and appearance. The height control systems are generally designed for adjusting attitude or inclination of vehicle bodies relative to road surface. For example, one of the typical type of vehicular height control systems has been disclosed in "GALANT ETERNAΣNEW MODEL EXPLANATION", page 111 through 137, published by Mitsubishi Motor Industries Co., Ltd., on August, 1983.

Such conventional vehicle height control systems employ a plurality of vehicle height sensors to monitor position of the associated section of the vehicle body relative to the road surface. The output of the height sensor is compared with reference value which defines a target vehicle height range. When the height is greater than the target height range, pressurized air in a pneumatic chamber in suspension assemblies is ventilated to reduce the pressure in the pnuematic chamber for decreasing the vehicle height toward the target height range. On the other hand, when the vehicle height is lower than the target height range, the pressure in the pneumatic chamber is increased to raise the vehicle height toward the target height range.

In the aforementioned height control system, the height adjustment is performed relative to respective sections of the vehicle body, where the height sensors are arranged. This facilitates control of the height at respective suspension assemblies, independently of the others. Such control systems successfully adjusts the height at respective positions of the vehicle body, it may not regulate the attitude of the vehicle. However, in practice, since there is a difference between the upper and lower limits of the target height range, this may adversely effect the inclination of the vehicle. For example, if one section of the vehicle is at the upper limit of the target height range and another section of the vehicle is at the lower limit of the target height range the vehicle could become inclined at an angle that would be detrimental to comfort appearance and performance characteristics of the vehicle.

SUMMARY OF THE INVENTION

Therefore, it is an object of the present invention to provide a precise vehicular height control system which can regulate a vehicular profile.

In order to accomplish the aforementioned and other objects, a vehicle height control system according to the invention, controls suspension assemblies to adjust the vehicle height within a predetermined height range. The vehicle height control system is further active to reduce height difference at respective positions of the vehicle body to reduce the height difference to be within a predetermined acceptable height difference range.

According to one aspect of the invention, a height control system for an automotive vehicle comprises a first and a second suspension assemblies arranged at different positions of a vehicle body, a first and second height adjusting means, respectively associated with the first and second suspension assemblies for adjusting first height at a first position of the vehicle body where the first suspension assembly is arranged and a second position of the vehicle body where the second suspension assembly is arranged, a first and a second vehicle height sensors monitoring the first and second heights for producing a first and second vehicle height indicative signals, a height adjusting means comparing the first and second vehicle height indicative signals with upper and lower thresholds respectively representative of upper and lower criteria of a target vehicle height range to output a first and second height control signals to the first and second height adjusting means for adjusting the first and second heights within the target height range, and a vehicular profile regulating means, active when both of the first and second heights are within the target height range, for deriving a difference between the first and second heights to output an attitude adjusting signal to at least one of the first and second height adjusting means to adjust corresponding one of first and second heights so as to maintain the height difference between the first and second height within a given acceptable height balance range.

In the preferred arrangement, the given acceptable height balance range defines narrower height range than that of the target height range. The given acceptable height balance range is set within the target height range. On the other hand, the target height range is set in relation to a predetermined standard height, and the upper threshold represents higher height position than the standard height in a given first magnitude and the lower threshold represents lower height position than the standard height in a given second magnitude. The first and second magnitudes are of equal value to each other. The given acceptable height balance range is set with respect to the standard height and is defined by an upper balance range criterion which is set at height position higher than the standard height in a given third magnitude and a lower balance range criterion which is set at height position lower than the standard height in a given fourth magnitude. Each of the third and fourth magnitudes are smaller than the first and second magnitudes. Also, the third and fourth magnitudes are of equal value to each other.

Each of the first and second height adjusting means comprises a pressure chamber associated with a corresponding one of the first and second suspension assemblies, means for adjusting pressure in the pressure chamber for increasing the corresponding one of the first and second heights by increasing the pressure and decreasing the height by decreasing the pressure in the pressure chamber. The pressure chamber is connected to a pressure source via a valve unit which controls introduction and exhaust the pressure into and from the pressure chamber. The pressure source comprises a compressor for supplying a pressurized air as a working fluid and the pressure chamber is a pnuematic chamber defined above a shock absorber of the suspension assembly.

According to another aspect of the invention, a hydropneumatic suspension system facilitated with a height control system for an automotive vehicle comprises a first and a second suspension assemblies arranged at different positions of a vehicle body, a first and second height adjusting means, respectively associated with the first and second suspension assemblies and comprising first and second pneumatic chambers connected to a common pneumatic pressure source via first and second pressure control valve units, for adjusting first height at a first position of the vehicle body where the first suspension assembly is arranged and a second position of the vehicle body where the second suspension assembly is arranged, a first and a second vehicle height sensors for monitoring the first and second heights for producing a first and second vehicle height indicative signals, a height adjusting means for comparing the first and second vehicle height indicative signals with upper and lower thresholds respectively representative of upper and lower criteria of a target vehicle height range which is set with respect to a standard height, to output a first and second height control signals to the first and second height adjusting means for adjusting the first and second heights within the target height range, and a vehicular profile regulating means, active when both of the first and second heights are within the target height range, for deriving first and second height differences between the first and second heights and the standard height and a third difference between the first and second height differences, the vehicle profile regulating means comparing the third difference with a given value which corresponds the possible maximum height difference in a given acceptable height balance range defined with respect to the standard height by an upper balance criterion and a lower balance criterion, and to output an attitude adjusting signal to at least one of the first and second height adjusting means to adjust corresponding one of first and second heights so as to maintain the height difference between the first and second height within the given acceptable height balance range.

The given acceptable height balance range defines a narrower height range than that of the target height range. The given acceptable height balance range is set within the target height range.

The first and second pnuematic chambers are defined by means of rolling diaphragms above shock absorbers in the first and second suspension assemblies and connected to the common pneumatic source via a pressure line including a ventilation passage with a ventilation control valve and first and second pressure supply passages with first and second pressure supply control valves.

Preferably, the vehicular profile regulating means is responsive to the third difference greater than the given value, to compare the first and second height differences with the upper balance criterion and lower balance criterion for deriving control magnitude of the first and second height adjusting means. The vehicular profile regulating means is responsive to the third difference greater than the given value, to compare the first and second height differences with the upper balance criterion and lower balance criterion for selecting one of the first and second height adjusting means to be operated for height adjustment for regulating the vehicular profile.

BRIEF DESCRIPTION OF THE DRAWINGS

In the drawings:

FIG. 2 is a diagram of the preferred embodiment of a vehicle height control system according to the present invention;

DESCRIPTION OF THE PREFERRED EMBODIMENT

Figure 1:
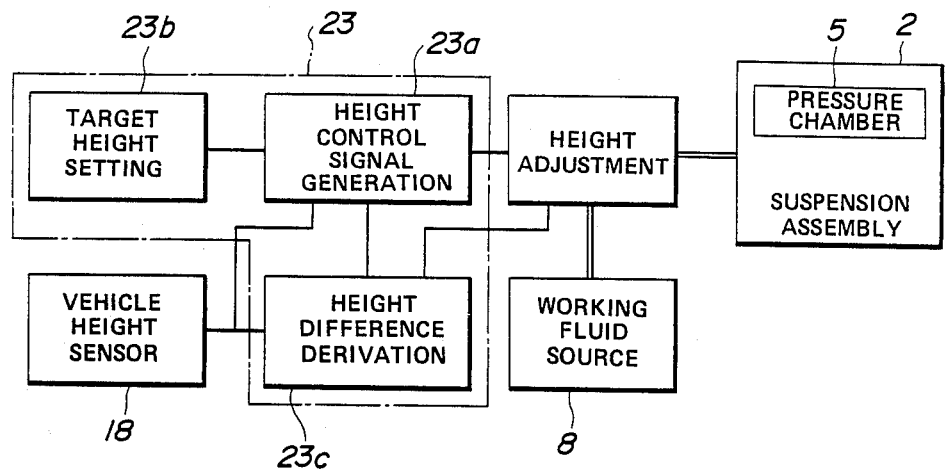
FIG. 1 is a schematic block diagram of a vehicle height control system according to the invention.

Referring now to the drawings, the basic idea of the present invention will be illustrated with reference to FIG. 1 in order to outline the invention. A vehicle height control system, according to the present invention, includes a plurality of suspension assemblies 2, each of which has a pressure chamber 5. The pressure chamber 5 is connected to a working fluid source 8 to introduce and exhaust the pressurized working fluid for adjusting the pressure therein to a desired level. The pressure chamber 5 is so associated with the suspension assembly as to increase the distance between a wheel axle and a vehicle body as the pressure in the pressure chamber 5 is increased, and decrease the distance as the pressure in the pressure chamber is decreased.

In order to control the pressure in the pressure chambers 5 of respective suspension assemblies 2, pressure control units are interposed between the working fluid source 8 and the pressure chambers 5 of the suspension assemblies 2. Each pressure control unit controls introduction and exhaust of the pressurized working fluid to adjust the pressure in the associated pressure chamber 5. When the working fluid is introduced into the pressure chamber 5, the pressure is increased. By increasing the pressure in the pressure chamber 5, the relative distance between the wheel axle and the vehicle body 1 is increased. On the other hand, by exhausting the working fluid from the pressure chamber 5, the pressure in the pressure chamber is decreased to decrease the relative distance between the wheel axle and the vehicle body. The pressure control units are generally operative for adjusting the pressure in the pressure chambers 5 of the suspension assemblies 2 and thus maintain the relative distances between the wheel axles and the vehicle body 1 within a predetermined target height range.

For controlling the operation of the pressure control units, a control unit 23 is provided. The control unit 23 comprises a control signal generation stage 23a, a target height range setting stage 23b and a height difference detecting stage 23c. The control unit 23 receives vehicle speed indicative signals from vehicle height sensors 18, each of which are provided adjacent the corresponding suspension assembly 2. The vehicle height sensor 18 monitors the relative distance between a wheel axle and an associated portion of the vehicle body 1 to produce the vehicle height indicative signal indicative thereof. The target height range setting stage 23b provides upper criterion indicative value $\Delta h_U$ and a lower criterion indicative value $\Delta h_L$, combination of which defines the target height range $\Delta h$. The control signal generation stage 23a receives the vehicle height indicative signals from the vehicle height sensors 18 and the upper and lower criteria indicative values to compare. When the vehicle height indicative signal value h is greater than the upper criterion indicative value $\Delta h_U$, a DOWN control signal is output from the control signal generation stage 23a for exhausting the pressurized working fluid in the pressure chamber 5 to decrease the vehicle height h at the portion where the relevant suspension assembly 2 is provided. On the other hand, when the vehicle height h is lower than the lower criterion indicative value $\Delta h_L$, an UP control signal is output by the control signal generation stage 23a for raising the vehicle height h. Therefore, the DOWN and UP control signals are input to the pressure control units respectively associated with the pressure chamber 5 of the suspension assemblies. The pressure control unit is responsive to the DOWN and UP control signals to exhaust and introduce the pressurized working fluid from the working fluid source 8.

The control unit 23 is further provided with a height difference derivation stage 23c. The height difference derivation stage 23c receives the vehicle height indicative signals at least two of the vehicle height sensors to compare the received signal values. The height difference derivation stage 23c further compares the height indicative value with a given threshold value X which is representative of allowable maximum difference of the heights. The height difference derivation stage 23c is also connected to the control signal generation stage to receive therefrom an enabling signal when the vehicle heights h are within the target height range $\Delta h$. The height difference derivation sage 23c, as enabled, produces height adjustment signal to the pressure control units. The pressure control units are also responsive to the height adjustment signals for introducing and exhausting the pressurized working fluid to adjust the height at the relevant suspension assemblies to reduce the difference between the relative heights to be smaller than the threshold value X.

By the adjusting the relative heights between the relevant suspension assemblies, the vehicle's attitude can be regulated.

It should be appreciated that the word 'attitude' used throughout the disclosure and appended claims has to be understood as to means magnitude of inclination or inclination of the vehicle body either in longitudinal or lateral directions.

The detailed construction of the preferred embodiment of the vehicle height control system, according to the invention will be described herebelow with reference to FIG. 2. In the shown embodiment of FIG. 2, the preferred embodiment of a vehicle height control system according to the invention is directed to control heights at the portions of the vehicle body, where suspension assemblies 2a and 2b for left rear and right rear wheels are connected. The suspension assemblies includes suspension links 3a and 3b, shock absorbers 4a and 4a, suspension coils (not shown) and so forth. The shock absorbers 4a and 4b are connected to the suspension links 3a and 3b at the lower ends. Piston rods of the shock absorbers 4a and 4b extend upwardly and are connected to the vehicle body at the upper ends thereof. Pneumatic chambers 5a and 5b which serve as the aforementioned pressure chambers, are defined above the shock absorbers 4a and 4b by means of expandable members, such as rolling diaphragms 6a and 6b. Each of the pneumatic chambers 5a and 5b are connected to a compressor 8 via pressurized air supply circuits. An air dryer 9 is disposed in the air supply circuit. A ventilation control valve 13 is provided in a ventilation passage connected to the air supply circuit upstream of the air dryer 9. A branch circuit including a reservoir tank 7 is connected to the downstream side of the air dryer 9 of the air supply circuit. An one-way check valve 10 is provided in the branch circuit upstream of the reservoir tank. On the other hand, a pressure accumulation control valve 11 is provided in the branch circuit downstream of the reservoir tank 7. Pressure control valves 12a and 12b are provided in the air supply circuit for controlling introduction and exhaust of the pressurized air.

The ventilation control valve 13, the pressure accumulation control valve 11 and the pressure supply control valves 12a and 12b are respectively associated with electrically operable actuators 16, 14, 15a and 15b. In practice, the actuators 16, 14, 15a and 15b are electromagnetic solenoids. The compressor 8 is mechanically connected with an electric motor 22. The electric motor 22 is connected to a battery 20 via a relay switch 21.

Respective actuators 14, 15a, 15b and 16 and the relay switch 21 are connected to a microprocessor based control unit 23. The control unit comprises a microprocessor 24 and driver circuits 25, 26a, 26b, 27 and 28 respective connected to the actuators 14, 15a, 15b and 16 and the relay switch 21. As set forth with respect to FIG. 1, the control operations of the unit 23 are generally based on the actual vehicle height $h_L$ and $h_R$ at the portions of the vehicle body 1, where the suspension assemblies 2a and 2b are provided. In order to monitor the actual vehicle heights $h_L$ and $h_R$, vehicle height sensors 18a and 18b are provided. In the shown embodiment, the vehicle height sensors 18a and 18b comprise potentiometers or strain guages interposed between the vehicle body 1 and the suspension links 3a and 3b. However, as the vehicle height sensor, any type of sensor which can monitor relative vehicle height can be employed for monitoring the vehicle height.

The vehicle height sensors 18a and 18b monitor the vehicle heights $h_L$ and $h_R$ to produce vehicle indicative signals at rear left and rear right suspension positions. In addition, in order to monitor the pressure in the reservoir tank 7, a pressure sensor 19 is provided. The pressure sensor 19 produces a tank pressure indicative signal.

As is well known, the microprocessor 24 comprises an interface 29, an arithmetic unit 30, such as CPU, and a memory 31. The microprocessor 24 receives the vehicle height indicative signals from the vehicle height sensors 18a and 18b, and the tank pressure indicative signal from the pressure sensor 19 via the interface 29. Based on the vehicle height indicative signals, the arithmetic unit 30 derives height control signals to be fed to the driver circuits 25, 26a, 26b and 27. On the other hand, the arithmetic unit 30 derives a compressor control signal on the basis of the tank pressure indicative signal to feed to the driver circuit 28.

Figure 3A:
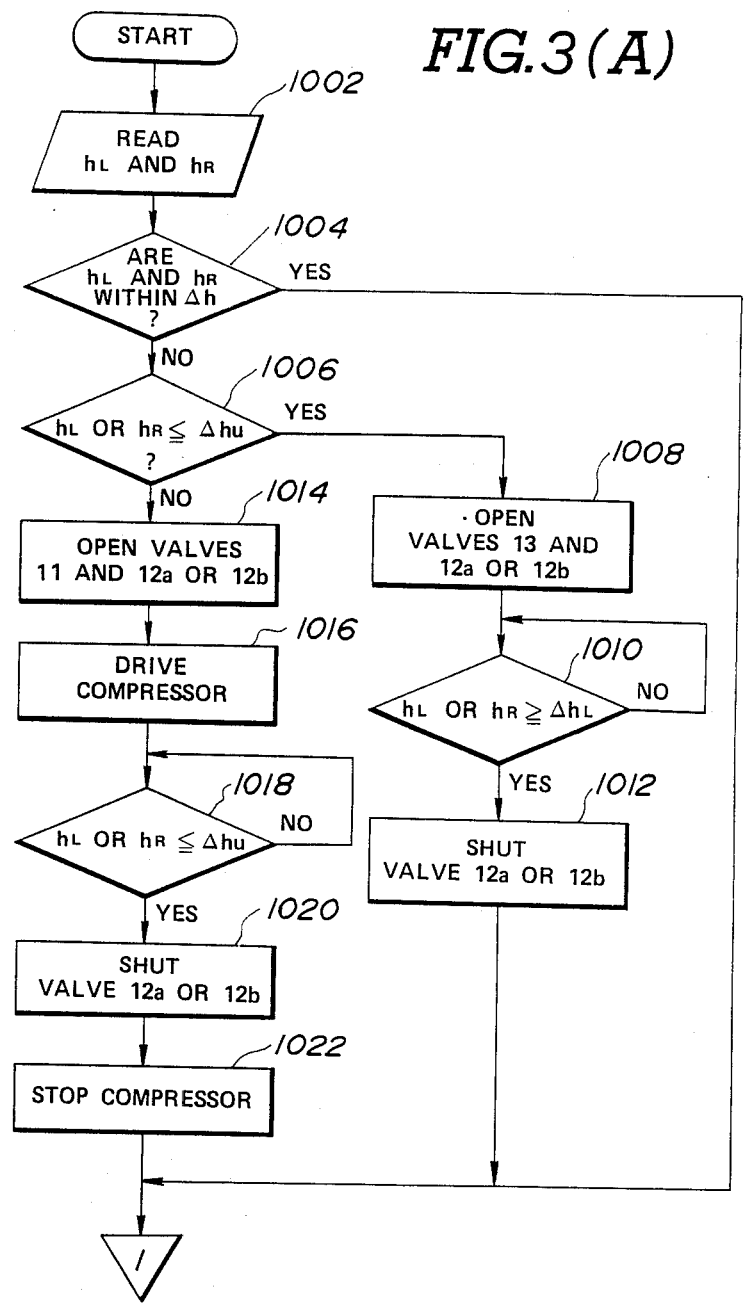
FIGS. 3(A), 3(B) and 3(C) are a sequential flowchart of a vehicle height control program to be executed by a control unit employed in the preferred embodiment of the vehicle height control system of FIG. 2.
Figure 3B:
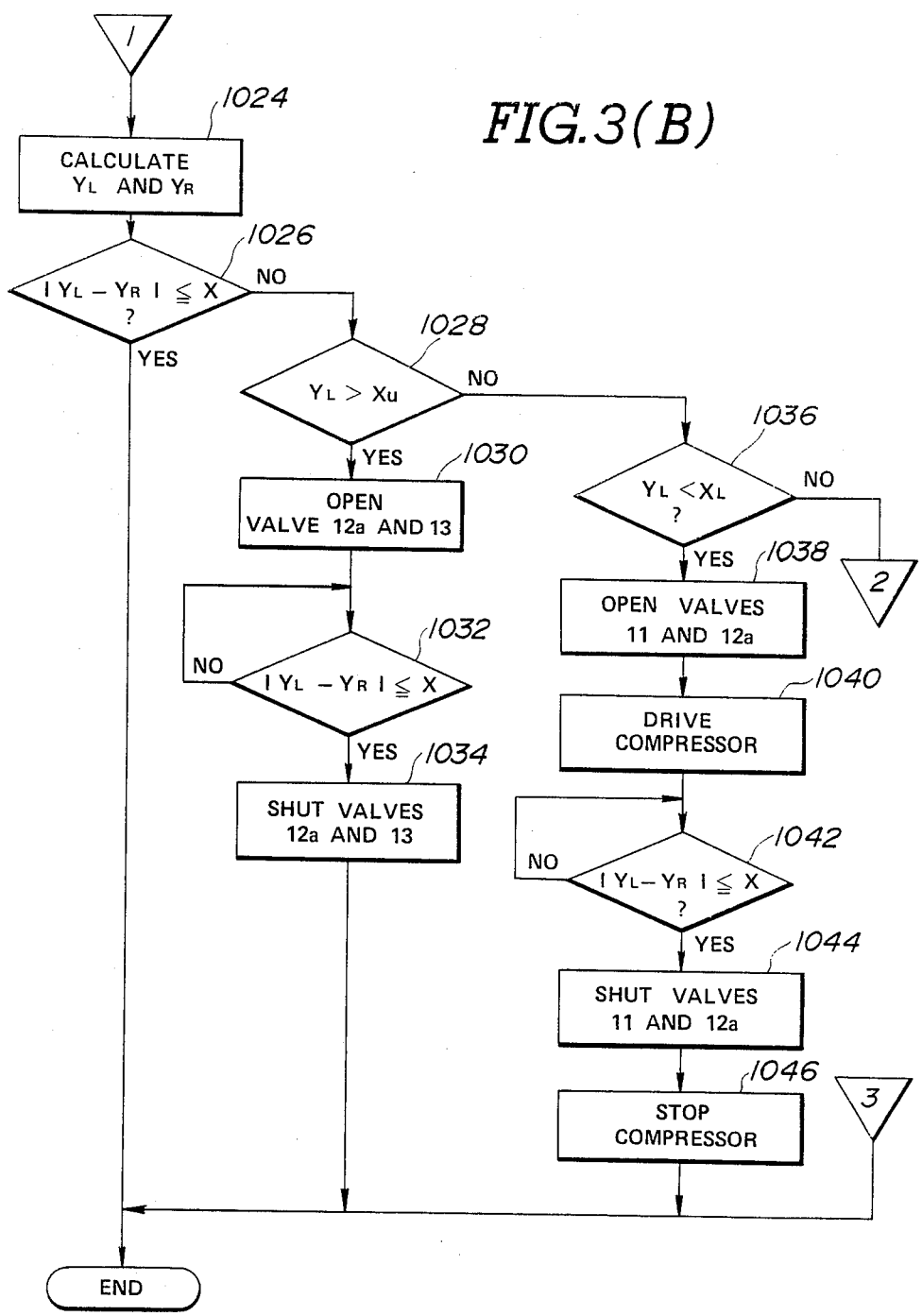
Figure 3C:
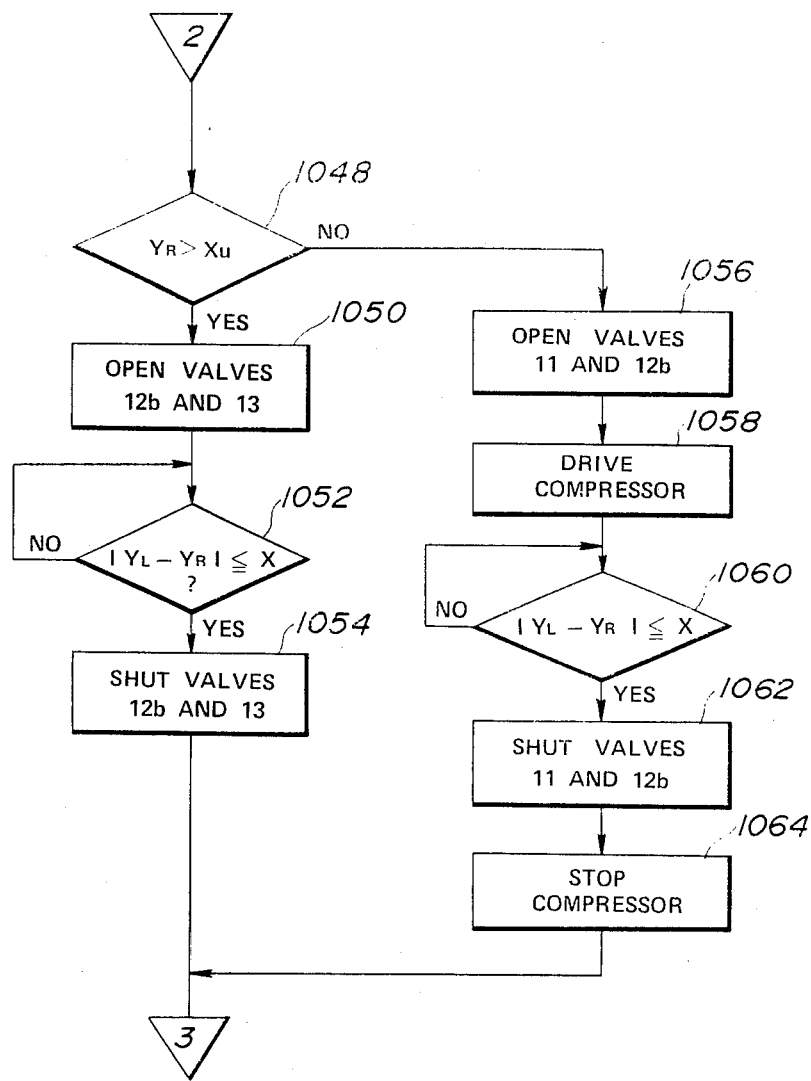

The vehicle height control operation and vehicular attitude regulating operation to be performed in the vehicle height control system of FIG. 2, will be described herebelow mainly with reference to FIGS. 3(A), 3(B) and 3(C).

It should be appreciated that the vehicle height control program is cyclical with predetermined intervals. Therefore, the arithmetic unit 30 is triggered at given timings. The arithmetic unit 30 as triggered reads out the vehicle height control program from the memory unit 31 and starts execution of the program.

Immediately after starting execution, the vehicle height indicative signal values $h_L$ and $h_R$ from the vehicle height sensors 18a and 18b are read at a step 1002. After reading the vehicle height indicative signal values $h_L$ and $h_R$, vehicle height regulating process in steps 1004 through 1022 is carried out to adjust the vehicle height at the positions of the vehicle body, where the rear left and rear right suspension assemblies 2a and 2b are provided.

In order to simplify the following disclosure, the vehicle height $h_L$ at the position where the rear left suspension assembly 2a is provided, will be hereafter referred to as 'left height'. Similarly, the vehicle height $h_R$ at the position where the rear right suspension assembly 2b is provided, will be hereafter referred to as 'right height'. The position of the vehicle body where the rear left suspension assembly will be simply referred to as 'left side' and the position of the vehicle body where the rear right suspension assembly is provided will be simply referred to as :right side', in the following disclosure.

It should be further appreciated that the steps 1004 through 1022 are performed with respect to the left side and the right side of the vehicle body, each independently of the other. Therefore, following discussion with respect to the steps 1004 through 1022 are made in turns of vehicle regulation for the left side of the vehicle body. It should be appreciated though the detailed discussion will be neglected same vehicle regulating process will be carried out through the steps 1004 to 1022 for the right side of the vehicle body.

Figure 4:
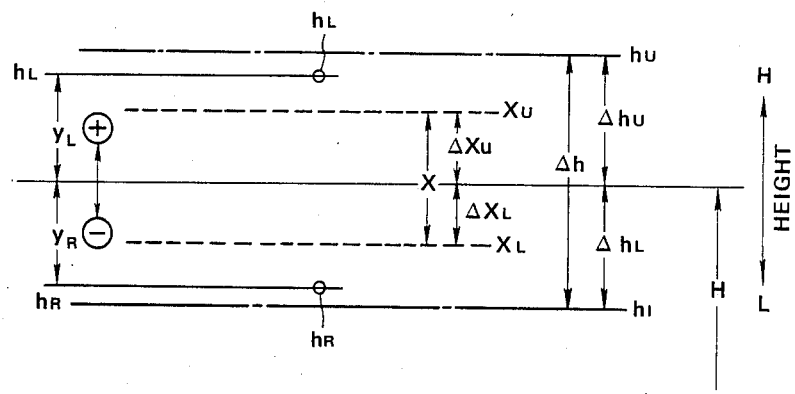
FIG. 4 is a illustration of an example of heights at different positions of the vehicle body.

In the height regulating operation for the left side of the vehicle body, the read value $h_L$ is checked whether it indicates the vehicle height is within the target height range $\Delta h$, at a step 1004. In the shown embodiment, the target height range $\Delta h$ is set with respect to a center value H of the target height, as shown in FIG. 4. The target range is thus defined by the upper criterion indicative value $\Delta h_U$ which is higher than the center value H of the target height in a magnitude of $h_u$ and the lower criterion indicative value $\Delta h_L$ which is lower than the center value H in a magnitude of $h_1$. Therefore, the height difference between the upper criterion indicative value $\Delta h_U$ and the lower criterion indicative value $\Delta h_L$ becomes ($h_u - h_1 = \Delta h$). The target height range $\Delta h$ constitutes a deadband in height control.

In practice, in order to check whether the vehicle height indicative signal values $h_L$ is within the target height range $\Delta h$, the height indicative signal values are compared with the upper criterion indicative value $\Delta h_U$ and the lower criterion indicative value $\Delta h_L$ at the step 1004. If the vehicle height indicative signal values $h_L$ is within the target height range $\Delta h$ as checked at the step 1004, the program jumps to step 1024, operation of which will be described later.

On the other hand, if left height indicative signal value $h_L$ indicates that the vehicle height at the positions of the left side is out of the target height range $\Delta h$, check is made at a step 1006, as to whether the vehicle height indicative signal value $h_L$ indicates excessive height of the left side of the vehicle body, process then goes to a step 1008. At the step 1008, the HIGH height control signals are output to the driver signal generators 26a and 27. The driver signal generators 26a and 27 are responsive to the HIGH level height control signals to operate the actuators 15a and 16 to open the pressure control valve 12a and the ventilation control valve 13. By this, the pneumatic chamber 5a is exposed to the atmosphere via the pressure control valve 12a and the ventilation control valve 13. Therefore, the pressurized air in the pneumatic chamber 5a is exhausted through the ventilation passage to lower the pressure in the pneumatic chamber. As a result, the left height is lowered. After this, at a step 1010, the vehicle height indicative signal value $h_L$ is again read out and checked whether it indicates that the left height is within the target height range $\Delta h$. During execution of the step 1010, the pressure control valve 12a and the ventilation control valve 13 are held open to continue reduction of the pressure in the pneumatic chamber 5a. The process in the step 1010 is performed repeatedly until the left height $h_L$ is detected to be within the target height range $\Delta h$. As soon as the left height $h_L$ is detected to be within the target height range $\Delta h$ at step 1010, the process goes to a step 1014 to terminate HIGH level height control signal for the driver signal generator 26a to make the actuator 15 inoperative. By this, the pressure control valve 12a is shut to block communication between the pneumatic chamber 5a and the ventilation passage.

On the other hand, when the answer at the step 1006 is NO which means that the left height $h_L$ indicates excessively low height of the vehicle body, the HIGH level height control signals are output to the driver signal generators 25 and 26a. As a result, the pressure accumulation control valve 11 and the pressure control valve 12a are operated to open. As a result, communication between the reservoir tank 7 and the pneumatic chamber 5a is established. After this, a pump drive control signal is fed to the driver signal generator 28. As a result, the drive signal is applied to a relay coil of the relay switch 21 to close the power supply circuit for the pump motor 22. Therefore, the pump motor 22 starts revolution to drive the compressor 8. By operation of the compressor, pressurized air is introduced into the pneumatic chamber 5a via the air dryer 9. At the same time, pressurised air is also introduced into the reservoir tank 7 via the pressure accumulation control valve 11. Pressurization of the pnuematic chamber 5a is continued until the left height $h_L$ rised into the target height range $\Delta h$. For this, at a step 1018, the left height indicative signal value $h_L$ is checked whether it indicates the left height within the target height range $\Delta h$. Checking at the step 1018 is repeated until the left is height within the target height range. When the left height $h_L$ comes within the target height range $\Delta h$ as checked at the step 1018, the HIGH level height control signals for the driver signal generators 25 and 26a are terminated, at a step 1020. As a result, the actuators 14 and 15a are deactivated to shut the pressure accumulation control valve 11 and the pressure control valve 12a. Thereafter, at a step 1022, the pump control signal for the driver circuit 28 is terminated to deenergize the relay coil to turn the relay switch 21 OFF. By this compressor 8 terminates operation.

As set forth, the same height adjustment operation is carried out for the right side of the vehicle body according to an identical process through steps 1004 to 1022. Unless both of the left height $h_L$ and the right height $h_R$ are adjusted to be within the target height range $\Delta h$, the process through the steps 1004 to the step 1022 are repeated. When the both of the left height $h_L$ and the right height $h_R$ are within the target height range $\Delta h$, as checked at the step 1004, the process jumps to the step 1024.

At the step 1024, height difference $y_L$ and $y_R$ of the left and right heights $h_L$ and $h_R$ and the center value H of the target height is calculated. Based on the values $y_L$ and $y_R$, the height difference $|y_L - y_R|$ is derived at a step 1026. The height difference $|y_L - y_R|$ is derived at a step 1026. The derived height difference $|y_L - y_R|$ is compared with a predetermined value X, at the step 1026. As can be seen from FIG. 4, the value X represents an acceptable height balance range for the left anf right heights, this acceptable height range is defined by an upper height balance criterion $X_U$ which is higher than the center value H by a magnitude $\Delta x_u$, and a lower height balance criterion $X_L$ which is lower than the center value H by a magnitude $\Delta x_1$. Therefore, height difference within the acceptable height balance range X becomes $(\Delta x_u + \Delta x_1)$.

If the height difference $|y_L - y_R|$ is smaller than or equal to the predetermined value X, the process goes to END. On the other hand, when the height difference $|y_L - y_R|$ is greater than the predetermined value X, then process goes to a step 1028. At the step 1028, the height difference value $y_L$ is compared with the upper height balance criterion indicative value $X_U$. When the height difference value $y_L$ is greater than the upper height balance criterion $X_U$, the HIGH level height control height control signals are fed to the driver signal generator circuits 26a and 27 for energizing the actuators 15a and 16 at a step 1030. As a result, the pressure control valve 12a and the ventilation control valve 13 are opened to expose the pneumatic chamber 5a to the atmosphere. As a result, the left height $h_L$ is lowered. During this left side lowering operation, the height difference $|y_L - y_R|$ is checked, at a step 1032, whether it becomes smaller than or equal to the predetermined value X. Until the height difference $|y_L - y_R|$ becomes smaller than the value X, the height control signals for the driver signal generators 26a and 27 are maintained at HIGH level to continuously lower the left side. When the height difference $|y_L - y_R|$ becomes smaller than the value X, the HIGH level height control signals for the driver circuits 26a and 27 are terminated at a step 1034. As a result, the pressure control valve 12a and the ventiation control valve 13 are shut. After shutting the pressure control valve 12a and the ventilation control valve 13 at the step 1034, the process goes END.

On the other hand, if the height difference value $y_L$ is smaller than $X_U$ as checked at the step 1028, process goes to step 1036. At the step 1036, the height difference value $y_L$ is compared with the lower height balance criterion $X_L$ to check whether the value $y_L$ is smaller than the criterion $X_L$. If this is the case, the HIGH level control signals are output to the driver signal generators 25 and 26a at step 1038. As a result, the pressure accumulation control valve 11 and the pressure control valve 12a are operated to open. As a result, communication between the reservoir tank 7 and the pneumatic chamber 5a is established. After this, a pump drive control signal is fed to the driver signal generator 28 at a step 1040. As a result, the drive signal is applied to a relay coil of the relay switch 21 to close the power supply circuit for the pump motor 22. Therefore, the pump motor 22 starts revolving to drive the compressor 8. By operation of the compressor, the pressurized air is introduced into the pneumatic chamber 5a via the air dryer 9. At the same time, the pressurised air is also introduced into the reservoir tank 7 via the pressure accumulation control valve 11. Pressurization of the pneumatic chamber 5a is continued until the left height $h_L$ is raised enough to make the height difference $|y_L - y_R|$ smaller than or equal to the predetermined value X. For this, at a step 1042, the height difference $|y_L - y_R|$ is compared with the value X to check whether it indicates the height difference $|y_L - y_R|$ is smaller than or equal to the value X. The checking at the step 1042 is repeated until the height difference $|y_L - y_R|$ is smaller than or equal to the value X. When the height difference $|y_L - y_R|$ is smaller than or equal to the value X as checked at the step 1042, the HIGH level height control signals for the driver signal generators 25 and 26a are terminated, at a step 1044. As a result, the actuators 14 and 15a are deactivated to shut the pressure accumulation control valve 11 and the pressure control valve 12a. Thereafter, at a step 1046, the pump control signal for the driver circuit 28 is terminated to deenergize the relay coil and turn the relay switch 21 OFF. By this compressor 8 terminates operation. After the step 1046, the process goes END.

On the other hand, when the height difference value $y_L$ is greater than or equal to the lower height balance criterion $X_L$ as checked at the step 1036, the process goes to a step 1048. At the step 1048, the height difference value $y_R$ is compared with the upper height balance criterion indicative value $X_U$. When the height difference value $y_R$ is greater than the upper height balance criterion $X_U$, the HIGH level height control height control signals are fed to the driver signal generator circuits 26b and 27 for energizing the actuators 15a and 16 at a step 1050. As a result, the pressure control valve 12b and the ventilation control valve 13 are opened to expose the pneumatic chamber 5b to the atmosphere. As a result, the right height $h_R$ is lowered. During this right side lowering operation, the height difference $|y_L - y_R|$ is checked, at a step 1052, whether it becomes smaller than or equal to the predetermined value X. Until the height difference $|y_L - y_R|$ becomes smaller than the value X, the height control signals for the driver signal generators 26b and 27 are maintained at HIGH level to continuously lower the left side height. When the height difference $|y_L - y_R|$ becomes smaller than the value X, the HIGH level height control signals for the driver circuits 26b and 27 are terminated at a step 1054. As a result, the pressure control valve 12b and the ventilation control valve 13 are shut. After shutting the pressure control valve 12b and the ventilation control valve 13 at the step 1054, the process goes END.

On the other hand, if the height difference value $y_R$ is smaller than $X_U$ as checked at the step 1048, process goes to a step 1056. At the step 1056, the HIGH level control signals are output to the driver signal generators 25 and 26b. As a result, the pressure accumulation control valve 11 and the pressure control valve 12b are operated to open. As a result, communication between the reservoir tank 7 and the pneumatic chamber 5b is established. After this, a pump drive control signal is fed to the driver signal generator 28 at a step 1058. As a result, the drive signal is applied to a relay coil of the relay switch 21 to close the power supply circuit for the pump motor 22. Therefore, the pump motor 22 starts revolving to drive the compressor 8. By operation of the compressor, the pressurized air is introduced into the pneumatic chamber 5b via the air dryer 9. At the same time, the pressurised air is also introduced into the reservoir tank 7 via the pressure accumulation control valve 11. Pressurization of the pneumatic chamber 5b is continued until the right height $h_R$ is increased to the point where the height difference $|y_L-y_R|$ smaller than or equal to the predetermined value X. For this, at a step 1060, the height difference $|y_L-y_R|$ is compared with the value X to check whether it indicates the height difference $|y_L-y_R|$ is smaller than or equal to the value X. The checking at the step 1060 is repeated until the height difference $|y_L-y_R|$ is smaller than or equal to the value X. When the height difference $|y_L-y_R|$ smaller than or equal to the value X as checked at the step 1060 is obtained, the HIGH level height control signals for the driver signal generators 25 and 26b are terminated, at a step 1062. As a result, the actuators 14 and 15b are deactivated to shut the pressure accumulation control valve 11 and the pressure control valve 12b. Thereafter, at a step 1064, the pump control signal for the driver circuit 28 is terminated to deenergize the relay coil to turn the relay switch 21 OFF. By this compressor 8 terminates operation. After the step 1064, the process goes END.

As will be appreciated from the operation of the preferred embodiment set forth above, height difference between the left side and the right side of the vehicle body can be brought within the acceptable range and thereby the vehicle attitude can be regulated. Though the shown embodiment has been directed towards regulating the vehicular attitude in terms of the height difference between left and right sides of the vehicle body, it should be possible to regulate the vehicular attitude in terms of the height difference between the front and rear ends of the vehicle body. Furthermore, it would also be possible to regulate the vehicular attitude by adjusting the vehicular height at all positions where the suspension assemblies are arranged.

It should also appreciated that though the specific embodiment has been disclosed in terms of one of a typical type of hydropneumatic suspension system, in which vehicle height regulating operation is performed by adjusting the air pressure in pneumatic chambers, the invention may be applicable for any type of vehicular height control systems which facilitates independent height control at various position of the vehicle body.

What is claimed is:

1. A height control system for an automotive vehicle comprising:
   first and second suspension assemblies arranged at different positions of a vehicle body;
   first and second height adjusting means, respectively associated with said first and second suspension assemblies for adjusting a first height at a first position of the vehicle body where said first suspension assembly is arranged and a second height at a second position of the vehicle body where said second suspension assembly is arranged;
   first and second vehicle height sensors monitoring said first and second heights at said first and second positions for producing first and second vehicle height indicative signals;
   a height adjusting means comparing said first and second vehicle height indicative signals with upper and lower thresholds respectively representative of upper and lower criteria of a target vehicle height range to output first and second height control signals to said first and second adjusting means for adjusting said first and second heights within said target height range; and
   a vehicular attitude regulating means, active when both of said first and second heights are within said target height range, for deriving a difference between said first and second heights to output an attitude adjusting signal to at least one of said first and second height adjusting means to adjust a corresponding one of said first and second heights so as to maintain said height difference between said first and second heights within a given acceptable height balance range.

2. A height control system as set forth in claim 1, wherein said given acceptable height balance range defines narrower height range than that of said target height range.

3. A height control system as set forth in claim 2, wherein said given acceptable height balance range is set within said target height range.

4. A height control system as set forth in claim 1, wherein said target height range is set in relation to a predetermined standard height, and said upper threshold represents higher position than said standard height in a given first magnitude and said lower threshold represents a lower position than said standard height in a given second magnitude.

5. A height control system as set forth in claim 4, wherein said first and second magnitudes are of equal value to each other.

6. A height control system as set forth in claim 4, wherein said given acceptable height balance range is set with respect to said standard height and is defined by an upper balance range criterion which is set at a position higher than said standard height in a given third magnitude and a lower balance range criterion which is set at a position lower than said standard height in a given fourth magnitude.

7. A height control system as set forth in claim 6, wherein each of said third and fourth magnitudes are smaller than said first and second magnitudes.

8. A height control system as set forth in claim 6, wherein said third and fourth magnitudes are of equal value to each other.

9. A height control system as set forth in claim 1, wherein each of said first and second height adjusting means comprises a pressure chamber associated with a corresponding one of said first and second suspension assemblies, means for adjusting pressure in said pressure chamber for increasing the corresponding one of said first and second heights by increasing said pressure and decreasing the height by decreasing the pressure in said pressure chamber.

10. A height control system as set forth in claim 9, wherein said pressure chamber is connected to a pressure source via a valve unit which controls introduction and exhaust the pressure into and from the pressure chamber.

11. A height control system as set forth in claim 10, wherein said pressure source comprises a compressor for supplying pressurized air as a working fluid and said pressure chamber is a pneumatic chamber defined above a shock absorber of the suspension assembly.

12. A hydropneumatic suspension system facilitated with a height control system for an automotive vehicle comprising:
   first and second suspension assemblies arranged at different positions of a vehicle body;
   first and second height adjusting means, respectively associated with said first and second suspension assemblies and comprising first and second pneumatic chambers connected to a common pneumatic pressure source via first and second pressure control valve units, for adjusting a first height at a first position of the vehicle body where said first suspension assembly is arranged and a second height at a second position of the vehicle body where said second suspension assembly is arranged;

first and second vehicle height sensors for monitoring said first and second heights at said first and second positions for producing first and second vehicle height indicative signals;

a height adjusting means for comparing said first and second vehicle height indicative signals with upper and lower thresholds respectively representative of upper and lower criteria of a target vehicle height range which is set with respect to a standard height, to output first and second height control signals to said first and second height adjusting means for adjusting said first and second heights within said target height range; and a vehicular attitude regulating means, active when both of said first and second heights are within said target height range, for deriving first and second height differences between said first and second heights and said standard height and a third difference between said first and second height differences, said vehicle attitude regulating means comparing said third difference with a given value which corresponds the possible maximum height difference in a given acceptable height balance range defined with respect to said standard height by an upper balance criterion and a lower balance criterion, and to output an attitude adjusting signal to at least one of said first and second height adjusting means to adjust a corresponding one of said first and second heights so as to maintain said height difference between said first and second heights within said given acceptable height balance range.

13. A hydropneumatic suspension system as set forth in claim 12, wherein said given acceptable height balance range defines a narrower height range than that of said target height range.

14. A hydropneumatic suspension system as set forth in claim 13, wherein said given acceptable height balance range is set within said target height range.

15. A hydropneumatic suspension system as set forth in claim 17, wherein said first and second pneumatic chambers are defined by means of rolling diaphragms above shock absorbers in said first and second suspension assemblies and connected to said common pneumatic source via a pressure line including a ventilation passage with a ventilation control valve and first and second pressure supply passages with first and second pressure supply control valves.

16. A hydropneumatic suspension system as set forth in claim 12, wherein said vehicular attitude regulating means is responsive to said third difference greater than said given value, to compare said first and second height differences with said upper balance criterion and lower balance criterion for deriving control magnitude of said first and second height adjusting means.

17. A hydropneumatic suspension system as set forth in claim 12, wherein said vehicular attitude regulating means is responsive to said third difference greater than said given value, to compare said first and second height differences with said upper balance criterion and lower balance criterion for selecting one of said first and second height adjusting means to be operated for height adjustment for regulating the vehicular attitude.

18. An attitude control system for an automotive suspension system comprising:

first and second suspension assemblies arranged at different positions of a vehicle body;

first and second height adjusting means, respectively associated with said first and second suspension assemblies and comprising first and second pneumatic chambers connected to a common pneumatic pressure source via first and second pressure control valve units, for adjusting a first height at a first position of the vehicle body where said first suspension assembly is arranged and a second height at a second position of the vehicle body where said second suspension assembly is arranged;

first means for detecting at least one of said first and second heights being out of a predetermined range defined by upper and lower criterion and sending commands to a corresponding one of said first and second adjusting means so as to maintain said first and second heights within said predetermined height range; and second means for monitoring height balance between said first and second positions and sending a balance control signal to at least one of said first and second height adjusting means for maintaining said height balance within a predetermined balance range.

19. An anti-rolling control system for an automotive suspension system comprising:

a first and a second suspension assemblies arranged at laterally offset positions of a vehicle body;

first and second height adjusting means, respectively associated with said first and second suspension assemblies and comprising first and second pneumatic chambers connected to a common pneumatic pressure source via first and second pressure control valve units, for adjusting a first height at a first position of the vehicle body where said first suspension assembly is arranged and a second height at a second position of the vehicle body where said second suspension assembly is arranged;

first means for detecting at least one of said first and second heights being out of a predetermined range defined by upper and lower criterion for sending commands to a corresponding one of said first and second adjusting means so as to maintain said first and second heights within said predetermined height range; and second means for monitoring height balance between said first and second positions and sending a balance control signal to at least one of said first and second height adjusting means for maintaining said height balance within a predetermined balance range.

20. An anti-pitching control system for an automotive suspension system comprising:

first and second suspension assemblies arranged at longitudinally offset positions of a vehicle body;

first and second height adjusting means, respectively associated with said first and second suspension assemblies and comprising first and second pneumatic chambers connected to a common pneumatic pressure source via first and second pressure control valve units, for adjusting a first height at a first position of the vehicle body where said first suspension assembly is arranged and a height at a second position of the vehicle body where said second suspension assembly is arranged;

first means for detecting at least one of said first and second heights being out of a predetermined range defined by upper and lower criterion for sending commands to a corresponding one of said first and second adjusting means so as to maintain said first and second heights within said predetermined height range; and second means for monitoring height balance between said first and second positions and sending a balance control signal to at least one of said first and second height adjusting means for maintaining said height balance within a predetermined balance range.

21. A vehicular attitude regulating system for an automotive suspension system comprising;

first and second suspension assemblies arranged at laterally and longitudinally offset positions of a vehicle body;

first and second height adjusting means, respectively associated with said first and second suspension assemblies and comprising first and second pneumatic chambers connected to a common pneumatic pressure source via first and second pressure control valve units, for adjusting a first height at a first position of the vehicle body where said first suspension assembly is arranged and a second height at a second position of the vehicle body where said second suspension assembly is arranged;

first means for detecting at least one of said first and second heights being out of a predetermined range defined by upper and lower criterion and sending commands to a corresponding one of said first and second adjusting means so as to maintain said first and second heights within said predetermined height range; and second means for monitoring height balance between said first and second position and sending a balance control signal to at least one of said first and second height adjusting means for maintaining said height balance within a predetermined balance range.

* * * * *